United States Patent [19]
Grow, II

[11] Patent Number: 5,903,981
[45] Date of Patent: May 18, 1999

[54] PIZZA CUTTING AND SERVING TOOL

[76] Inventor: Thomas C. Grow, II, 1546 Player Dr., Lexington, Ky. 40511

[21] Appl. No.: 09/028,349

[22] Filed: Feb. 24, 1998

[51] Int. Cl.[6] .................................................... A21C 5/00
[52] U.S. Cl. ................................................ 30/114; 30/299
[58] Field of Search ............................ 30/114, 294, 289, 30/299

[56] References Cited

U.S. PATENT DOCUMENTS

| | | | |
|---|---|---|---|
| 1,931,388 | 10/1933 | Ling | 30/114 |
| 2,571,465 | 10/1951 | McDevitt | 30/114 |
| 4,100,676 | 7/1978 | Ferguson | 30/114 X |

*Primary Examiner*—Douglas D. Watts
*Attorney, Agent, or Firm*—Craig E. Bolton

[57] ABSTRACT

A pizza cutting an serving tool is provide having manually closeable pivoted-jaw cutting blades. The blades close upon a serving spatula which may be triangular or rectangular in shape. The spatula includes peripheral groove means for receiving the blades. The grooves assist proper pizza shear and may receive the blades snugly to form sealed side walls of a serving tray.

8 Claims, 6 Drawing Sheets

PIZZA CUTTING AND SERVING TOOL

BACKGROUND OF THE INVENTION

The present invention relates to a pie cutting and serving tool which is particularly well adapted for cutting and serving slices of pizza pie of the kind which has become enormously popular in the United States only within the past 20 years. Earlier this century, prior art pastry cutting and serving tools have been developed including pivoted blades such as those disclosed by King et al. U.S. Pat. Nos. 2,182,726; or Gans 634,330. Prior devices have been designed mainly for cakes and pastry pies and are not well adapted for the problems peculiar to sanitary serving of pizza pie. They do not include groove means for positively severing pizza cheese, pepperoni or pizza dough. Prior art blades are pivoted at the handle instead of at the rear edge corners of the spatula where the pivots are needed to apply sufficient pressure for positively cutting stringy pizza cheese. Cheese that may otherwise become festooned across a serving table in an un-sanitary fashion possibly requiring manual contact that may contaminate the cheese and or soil the hands with grease and cooking oil. Accordingly, there exists a modern need for an improved cutting and serving tool which can accommodate positive and complete cutting of pizza crust and cheese to obviate the need for touching any part of the pizza or dangling ribbons of cheese during the serving process.

The present invention is a pizza cutting and serving tool including pivoted blades that cooperate with a grooved spatula to sever and serve pizza in a quick, sanitary and convenient manner. The spatula has peripheral grooves formed therein for receiving cutting edge portions of pivoted blades when the blades "clamp-down" like a pivoted jaw to sever a slice of pizza. The blades can be locked in their closed position engaging the grooves to form sealed side walls of a handy serving tray.

SUMMARY OF THE INVENTION

The present invention is a cutting and serving tool comprising a planar horizontal spatula having a rear edge and vertically pivoting cutting blades hinged at two pivot points spaced along the rear edge of the spatula to form a pivoted-jaw cutting tool. A handle is attached along the rear edge of the spatula and a blade gripping means is attached to a top edge of the vertically pivoting cutting blades. Peripheral groove means are formed in the spatula for receiving knife edge portions of the cutting blades when the cutting blades are drawn downwardly to positively sever the pizza.

One object of the present invention is to provide a pizza serving and cutting tool which saves time and labor in the process of severing and serving uniformly dimensioned single slices of popular pizza pie.

Another object is to provide a pizza serving and cutting tool which includes a spatula having groove means for cooperatively engaging pivoted cutting blades to positively sever pizza pie Another object is to provide a pizza serving and cutting tool which includes a spatula having groove means for receiving and seating pivoted blades as sealed rigid sidewalls of a serving tray.

Another object is to provide a pizza serving and cutting tool which is safe to use because its pivoted blades can be locked in a closed position.

A still further object is to provide a pizza cutting and serving tool which securely retains a uniformly dimensioned pizza slice on a serving spatula.

Another object is to provide a pizza cutting and serving tool which may be viewed as an entertaining accessory for enjoyable dining.

DETAILED DESCRIPTION OF THE INVENTION

Figure 1:
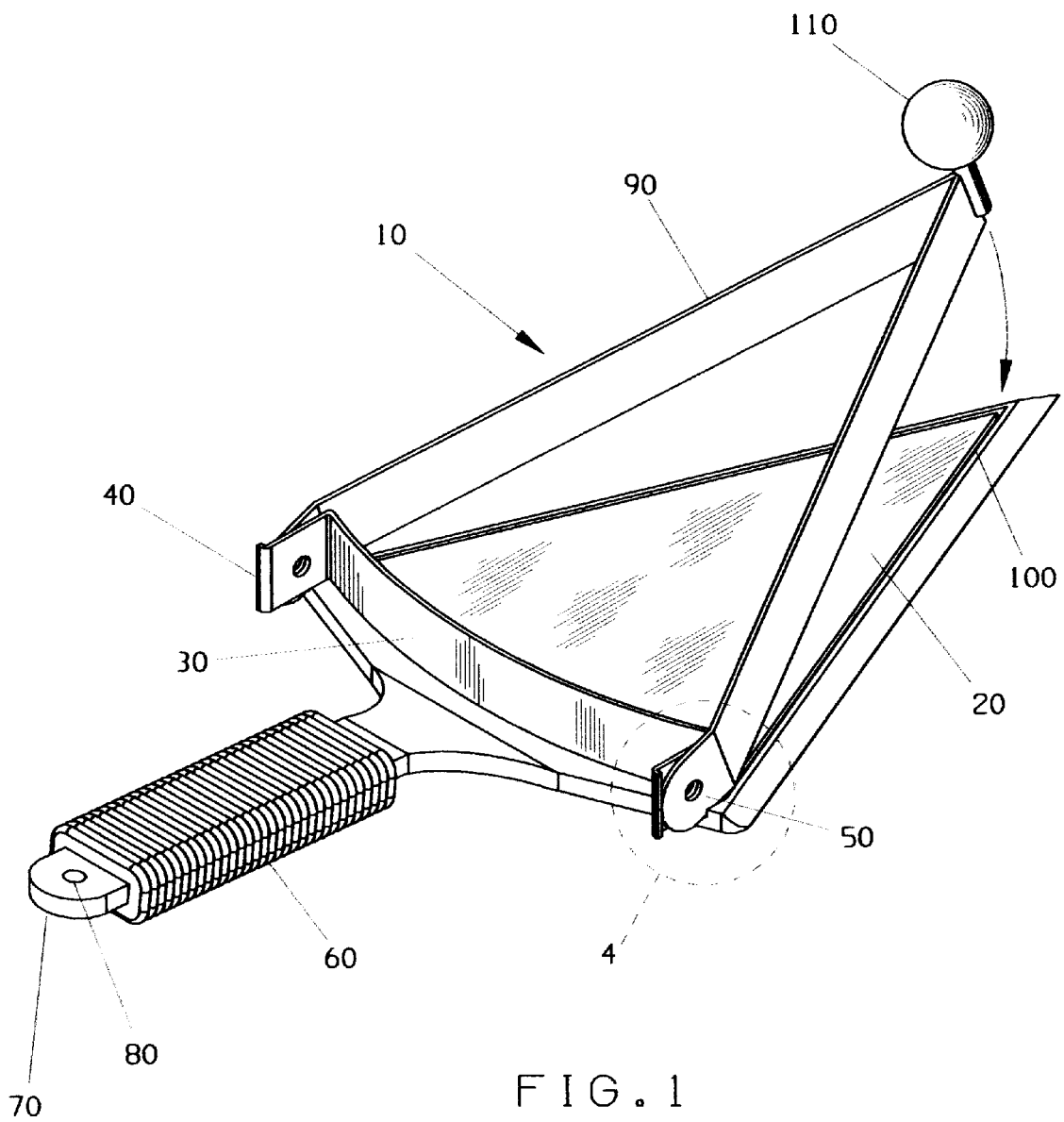
FIG. 1. is a perspective view of a pizza cutting and serving tool having a triangular spatula.
Figure 2:
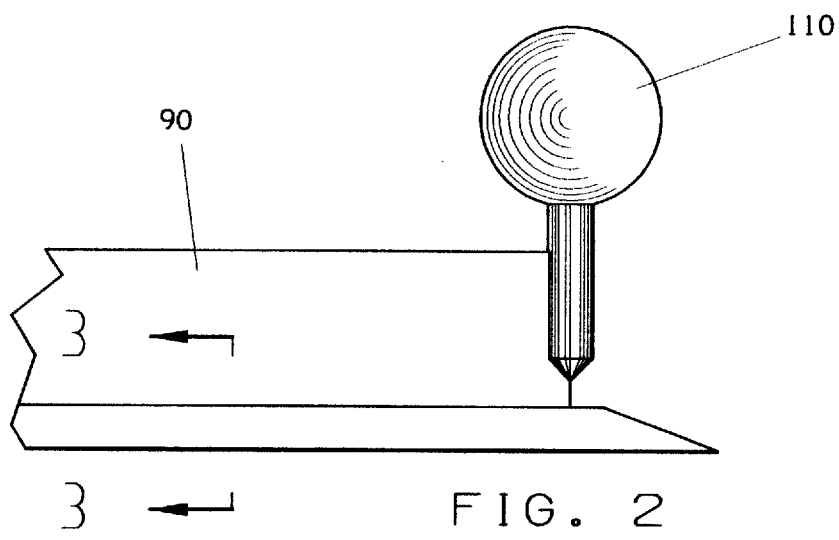
FIG. 2. is a side view of the tool showing blades 90 seated deep into groove 100.
Figure 3A:
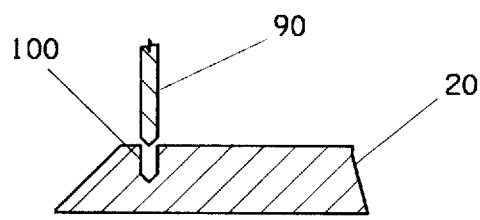
FIGS. 3a and 3b show a cross section of groove 100 taken along line 3—3 of FIG. 2 as blade 90 seats into groove 100.
Figure 3B:
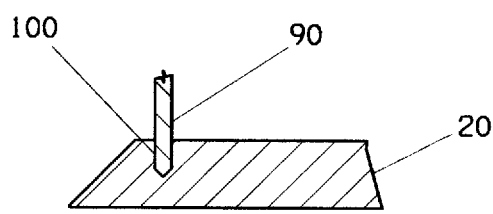
Figure 3C:
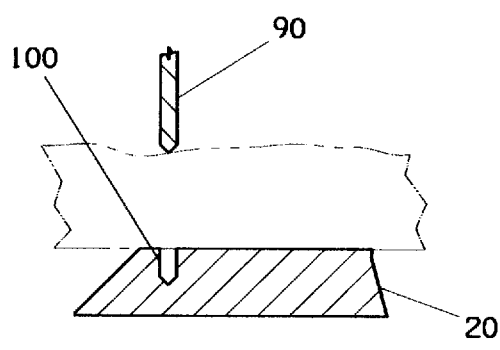
FIGS. 3c and 3d show severing of pizza as blade 90 seats into groove 100.
Figure 3D:
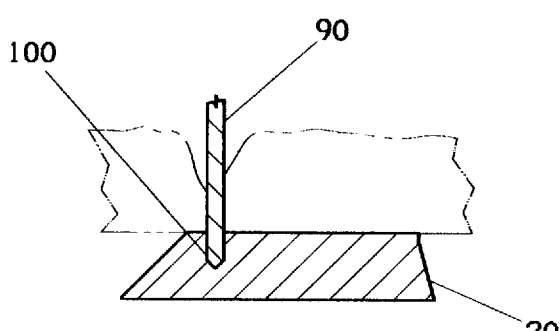

Referring now to the drawings, in particular FIG. 1, by way of reference numerals the pizza cutting and serving tool 10 comprises a flat horizontal spatula 20 having a rear edge 30 including a flange 40 carrying a blade pivot 50. Rear edge 30 may be formed by folding the rear edge of the spatula 20 upward about 90 degrees to form a rear wall for a serving tray, as shown. Pivot carrying flanges 40 may be formed by folding each end of the rear edge backwardly about 90 degrees, as shown. A handle 60 is attached along the rear edge 30 and may include a gripping surface 70 and a hanging hole 80. Journaled on horizontal pivots 50 are cutting blades 90 which may be connected to form a "V" shape, as shown, to cooperate with grooves 100 located near peripheral edge portions of a triangular spatula. Pivots 50 are preferably substantially coplanar with grooves 100 to provide best aligned pressure to the blades during the pizza cutting process. Grooves 100 may be formed by grinding, cutting or a milling process or they may be formed by a stamping operation or by any other suitable means, such as by molding or etching, for example. The spatula is advantageously thick in cross section to accommodate grooves of substantial depth and to provide a thermal mass which assists in the cutting of cheese by accommodating rapid local chilling of cheese as the blades cut and seat into their grooves. If the spatula is molded from relatively soft plastic material such as nylon, hard metal cutting edges may be cast in place along the sidewalls of the grooves to provide a hard cutting edge that cooperates with the pivoted blades 90 for completely severing cheese. The blades 90 swing vertically on horizontal pivots 50 to form a pivoted-jaw cutting tool. A knob 110 attached on the top edge of blades 90 at the apex of the "V", for example, provides a grip for drawing the blades downwardly into shearing engagement with pizza material. The bottom edges of the blades are sharpened to form knife edges for cutting. When blades 90 are forced firmly down, they sink through and sever pizza material then become embedded deep into groove 100, as shown in FIG. 2. The cutting action produces a precision cut slice of uniform dimension. Groove 100 may be tapered in cross-section, as shown in FIGS. 3a through 3d, to receive sharpened blade 90 in a snug, press-fit engagement to form sturdy sealed side walls of a serving tray and to provide positive pizza shear action. Blades 90 may be slightly bowed—like chair rockers—to provide for a progressive shearing of pizza material or they may be straight to provide chopping action.

Figure 4:
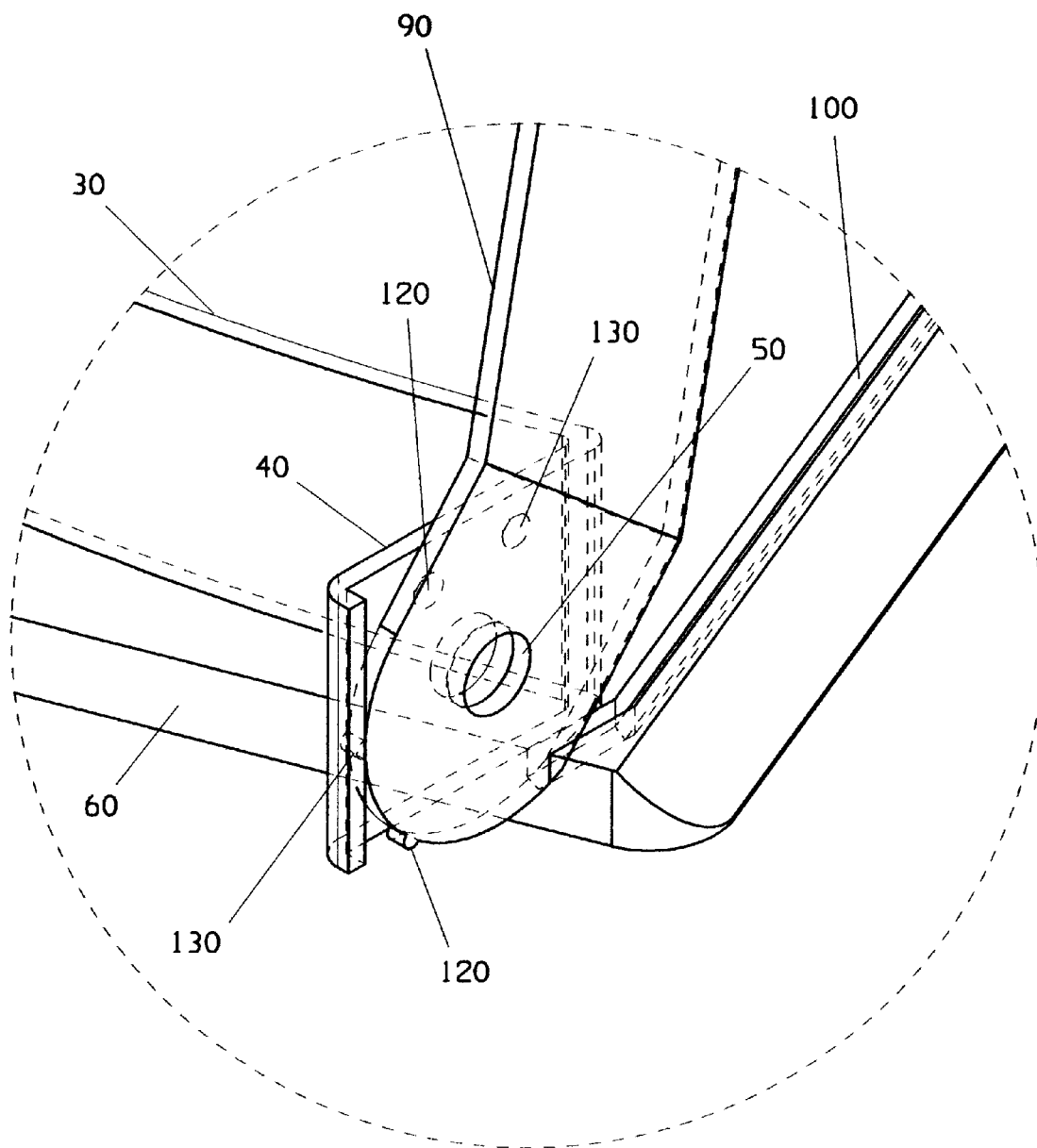
FIG. 4 is an enlarged view of a blade pivot having an adjacent-detent blade locking means.
Figure 4A:
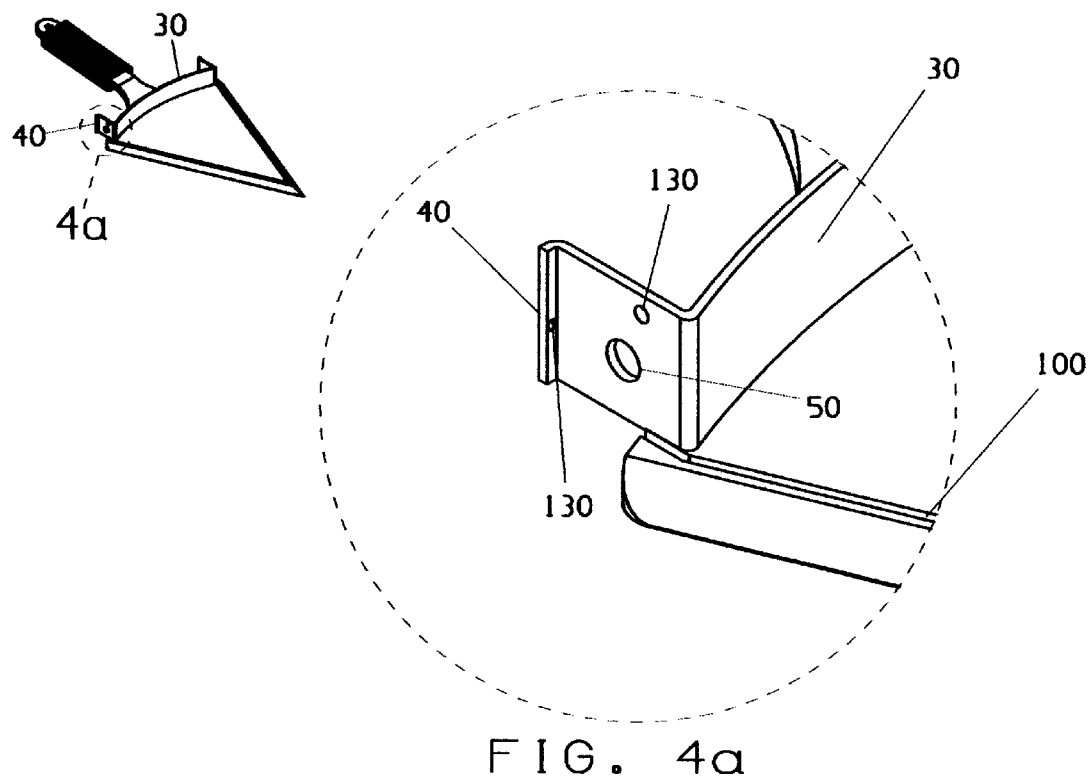
Figure 4B:
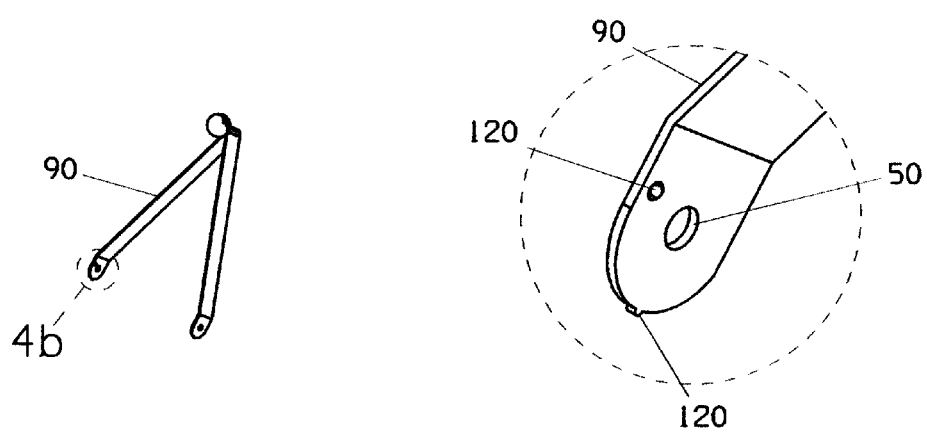

The blades can be locked in a closed position, as a child safety measure, to prevent pivoting of the blades to an open position. For example, Referring to FIG. 4, a detent 120 formed on the blade may be provided to engage a dimple 130 formed in flange 40 to form a coupled detent/dimple pair. The pair prevents or inhibits blade rotation about pivots 50 when the pair is coupled. Advantageously, the pair can be positioned to be coupled when the blades rotate to their closed position seated in groove 100. Positions of blade detents may be interchanged or reversed with flange dimples, respectively, so that the blade has a dimple and the flange has a detent, for example. More than one pair of detent/dimple couples may be provided to accommodate blade locking at several different angular positions or to increase resistance to rotation from one position. Various other means may be employed for locking the blades, as well. Such other means may include clips, pins, a holster or toggle links, for example.

Figure 5:
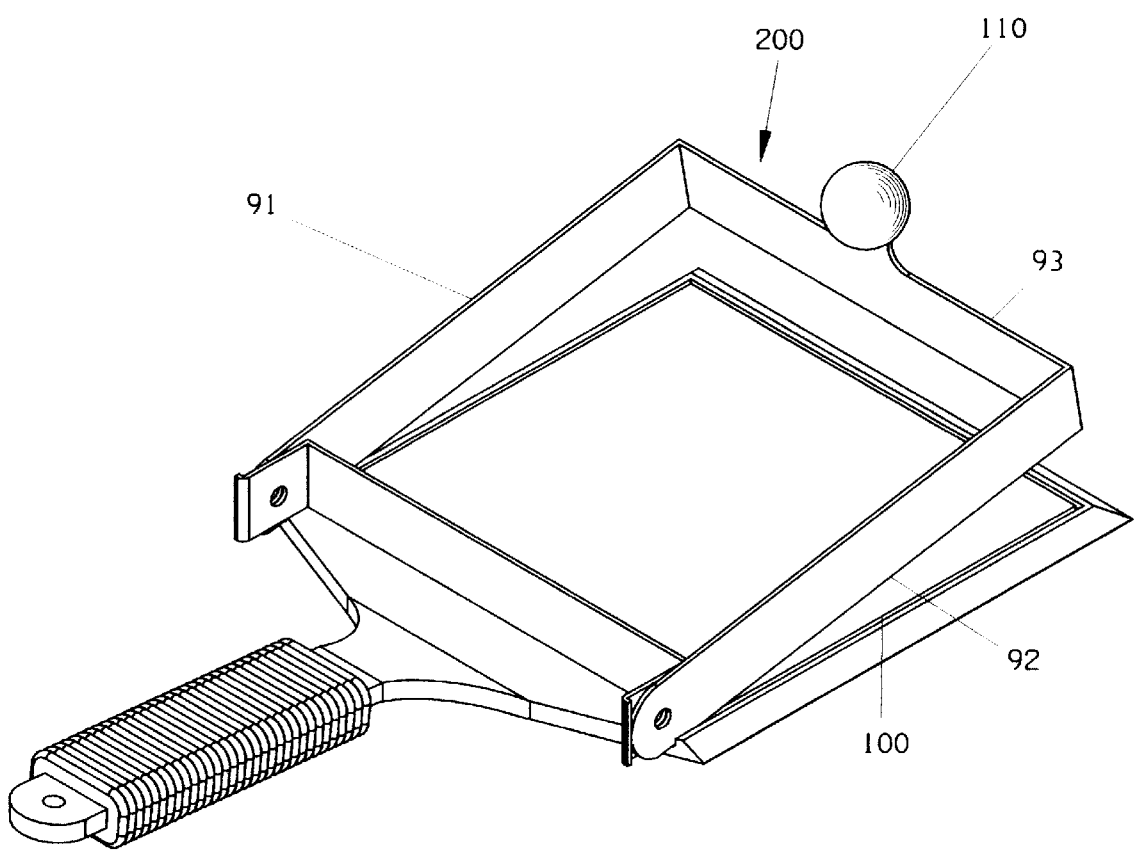
FIG. 5 is an alternative embodiment using a rectangular spatula.
Figure 6A:
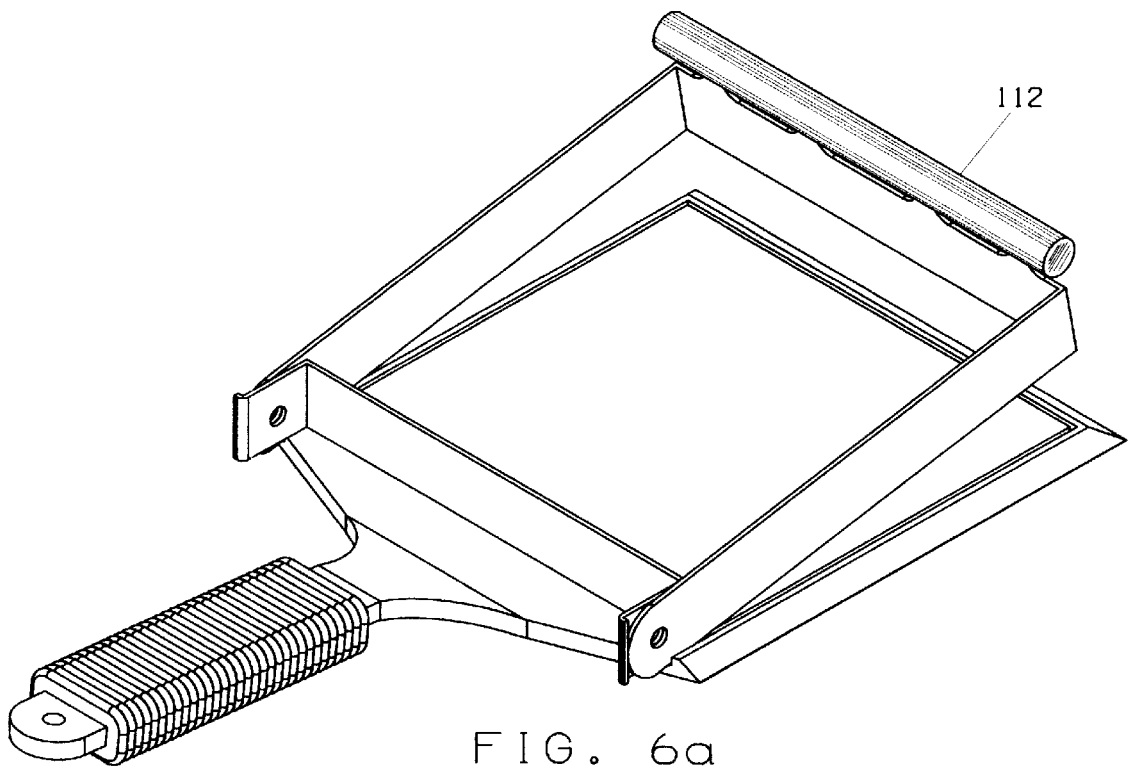
FIG. 6 is an alternative embodiment having a blade gripping bar in place of a knob.
Figure 6B:
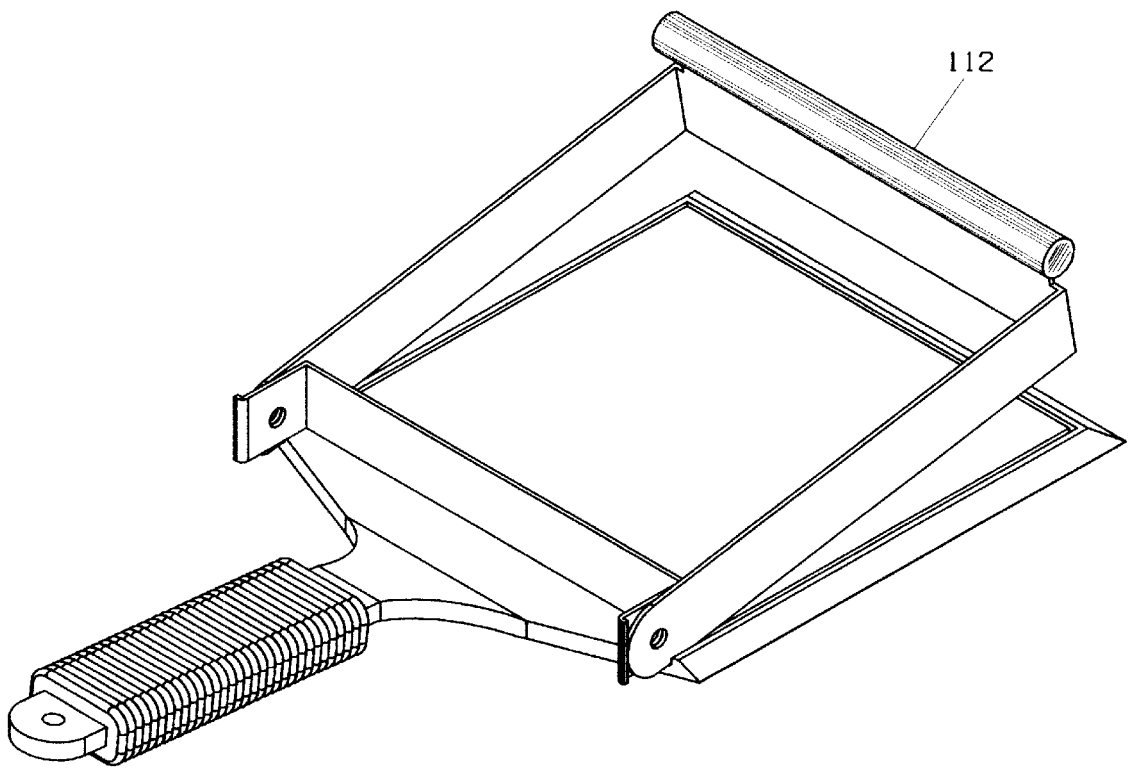

In an alternative embodiment, a rectangular spatula may be employed in place of a triangular one. FIG. 5 depicts a rectangular pizza cutting tool 200 having a rectangular spatula 210, two side blades 91 and 92 and a top blade 93. The blades are connected together to form three sides of a pivoted cutting rectangle. Side blades 91 and 92 are pivoted along the rear edge of the rectangular spatula at each corner of the spatula. Peripheral groove means 100 are provided to receive the blades of the cutting rectangle when they are closed to sever a slice of pizza. A knob 110 may be provided as a handle for gripping the top blade. Alternatively, an elongated bar 112 extending along and above the top edge of top blade 93, may be used in place of knob 110, as shown in FIG. 6. Although the device is especially useful for serving pizza pie, the device can also be used for cutting and serving any type of thin flat pie or pastry such as quesadillas, cookies, fudge, brownies or backalava, for example.

In use, the jaw-blades at room temperature are opened and the relatively cool spatula is inserted under one edge of a piping hot pizza. The spatula is extended under the pizza until a sector of suitable size is supported upon it. Then, blades 90 are closed and forced into seating engagement with their grooves. This action cuts through all pizza materials and defines a slice of uniform size. The assembly is then lifted away from the pie to separate a slice. Any cheese ribbons festooned to the pie may be severed by operating the blades open and closed while a single separated slice is supported near the pie. When all ribbons are severed, the blades are closed and seated into their grooves to form sealed side walls of a handy serving tray. The tray is then placed on the table in position for serving.

The tool can be made from any suitable material desired, such as stainless steel, for example. It may be ornamented or plated as desired and may include a Teflon coating.

It may be noted that various changes may be made in the details of construction without departing from the general spirit of the invention.

Having thus fully described the invention, what is claimed is:

1. A pizza cutting and serving tool comprising;
    a planar horizontal spatula having a rear edge and vertically pivoting cutting blades hinged at two pivot points spaced along said rear edge to form a pivoted jaw cutting tool,
    lock means for inhibiting rotation of said cutting blades about said pivot points,
    a handle attached along said rear edge of said spatula,
    blade gripping means attached to a top edge of said vertically pivoting cutting blades; and,
    peripheral groove means formed in said spatula for receiving knife edge portions of said cutting blades when said cutting blades are drawn downwardly to positively sever said pizza.

2. A pizza cutting and serving tool comprising;
    a planar horizontal spatula having a rear edge and vertically pivoting cutting blades hinged at two pivot points spaced along said rear edge to form a pivoted jaw cutting tool,
    lock means for inhibiting rotation of said cutting blades about said pivot points,
    said lock means including at least one detent/dimple pair adjacent at least one of said pivots,
    a handle attached along said rear edge of said spatula,
    blade gripping means attached to a top edge of said vertically pivoting cutting blades; and,
    peripheral groove means formed in said spatula for receiving knife edge portions of said cutting blades when said cutting blades are drawn downwardly to positively sever said pizza.

3. The pizza cutting and serving tool of claim 1 wherein said spatula is triangular in plan view,
    said rear edge forms the base of said triangular spatula,
    said cutting blades comprise one pair of blades forming two sides of a "V" shaped cutting triangle; and,
    each cutting blade is pivoted at each corner of said base and is aligned for mating engagement with said spatula groove means.

4. The pizza cutting and serving tool of claim 1 wherein at least one pivot point is coplanar with said groove means.

5. The pizza cutting and serving tool of claim 1 wherein said cutting blades are press-fit into said grooves to form sealed rigid side walls of a serving tray.

6. The pizza cutting and serving tool of claim 1 wherein said cutting blades are straight to accommodate chopping motion of said blades within said grooves.

7. The pizza cutting and serving tool of claim 3 wherein said blade gripping means comprises a knob attached to said top edge at the apex of said "V" shaped cutting triangle.

8. A pizza cutting and serving tool comprising;
    a planar horizontal spatula rectangular in plan view and having a rear edge and vertically pivoting cutting blades hinged at two pivot points spaced along said rear edge to form a pivoted jaw cutting tool wherein,
    said rear edge forms the base of said rectangular spatula,
    said cutting blades comprise three blades including two side blades and one top blade forming three sides of a cutting rectangle,
    a handle attached along said rear edge of said spatula,
    blade gripping means attached to a top edge of said vertically pivoting cutting blades,
    said blade gripping means comprising a bar attached along the upper edge of said top blade; and,
    peripheral groove means formed in said spatula for receiving knife edge portions of said cutting blades when said cutting blades are drawn downwardly to positively sever said pizza, each side blade being pivoted at each rear corner of said base and being aligned for mating engagement with said spatula groove means when said top blade is received in mating engagement with said spatula groove means.

* * * * *